(12) United States Patent
Jia et al.

(10) Patent No.: US 7,847,726 B2
(45) Date of Patent: Dec. 7, 2010

(54) NAVIGATIONAL SIGNAL TRACKING IN LOW POWER MODE

(75) Inventors: Zhike Jia, San Jose, CA (US); Shridhara A. Kurethaya, Cupertino, CA (US); Chi-Shin Wang, Half Moon Bay, CA (US)

(73) Assignee: Sirf Technology Holdings, Inc., San Jose, CA (US)

( * ) Notice: Subject to any disclaimer, the term of this patent is extended or adjusted under 35 U.S.C. 154(b) by 96 days.

(21) Appl. No.: 11/615,431

(22) Filed: Dec. 22, 2006

(65) Prior Publication Data
US 2008/0150797 A1 Jun. 26, 2008

(51) Int. Cl.
*G01S 1/00* (2006.01)
(52) U.S. Cl. .................................. 342/357.06
(58) Field of Classification Search ...............
342/357.01–357.17
See application file for complete search history.

(56) References Cited

U.S. PATENT DOCUMENTS

| | | | |
|---|---|---|---|
| 5,592,173 A * | 1/1997 | Lau et al. ............... | 342/357.12 |
| 6,252,545 B1 | 6/2001 | Bernards | |
| 6,611,756 B1 | 8/2003 | Chen | |
| 6,731,701 B2 | 5/2004 | Vorobiev | |
| 6,775,802 B2 | 8/2004 | Gaal | |
| 6,965,760 B1 | 11/2005 | Chen | |
| 2007/0268180 A1 * | 11/2007 | Zhi et al. ............... | 342/357.12 |

* cited by examiner

*Primary Examiner*—Thomas H Tarcza
*Assistant Examiner*—Nga X Nguyen
(74) *Attorney, Agent, or Firm*—Mark J. Danielson; Pillsbury Winthrop Shaw Pittman LLP

(57) ABSTRACT

The present invention provides systems and methods for navigational signal tracking in low power mode to conserve the power of handheld navigation receivers. In an embodiment, the receiver cycles between sleep and wakeup states. During the sleep state, most of the components of the receiver are powered off to conserve power, and during the wakeup state, the receiver tracks navigational signals. In an embodiment, the duty cycle of the sleep/wakeup states depends on the receiver dynamic state, e.g., whether the receiver is accelerating. In another embodiment, during the wakeup state, the receiver selects a tracking mode based on the signal strength. Under weak signal conditions, a tracking mode using a long integration to track the satellite signal is disclosed. In one embodiment, a tracking mode tracks the navigation signal by performing data aided integration using known or predicted data bits, such as the TLM and HOW words.

36 Claims, 5 Drawing Sheets

Flowchart of the low power tracking process

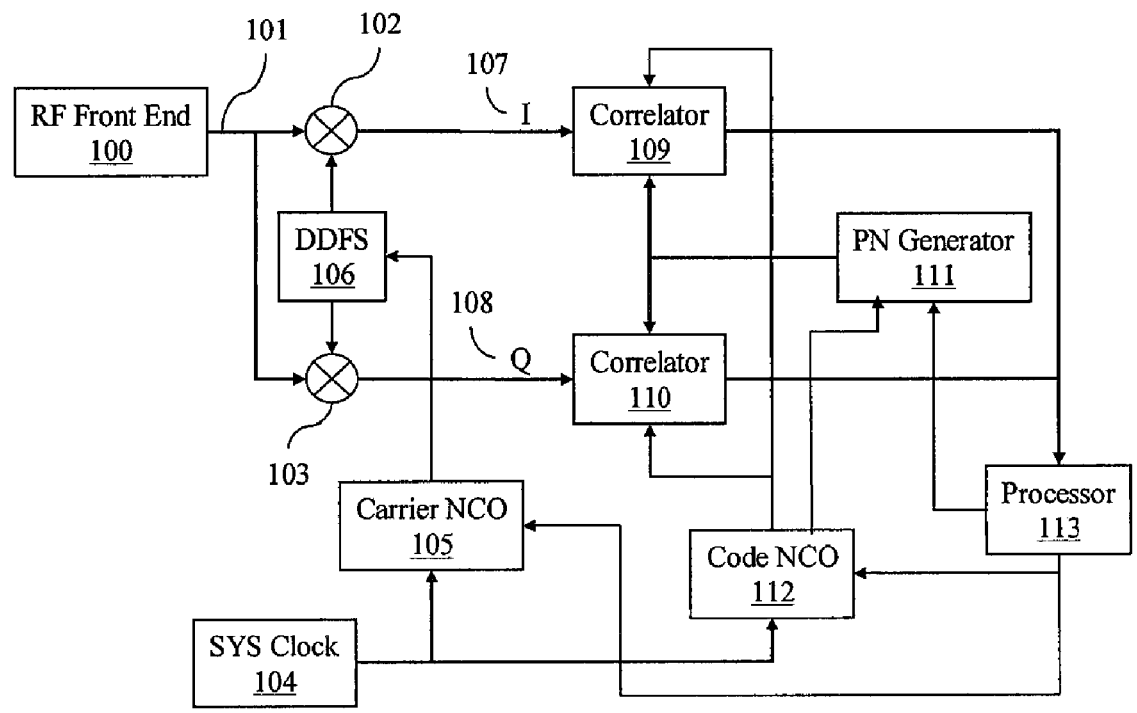
FIG. 1A  A GPS baseband hardware

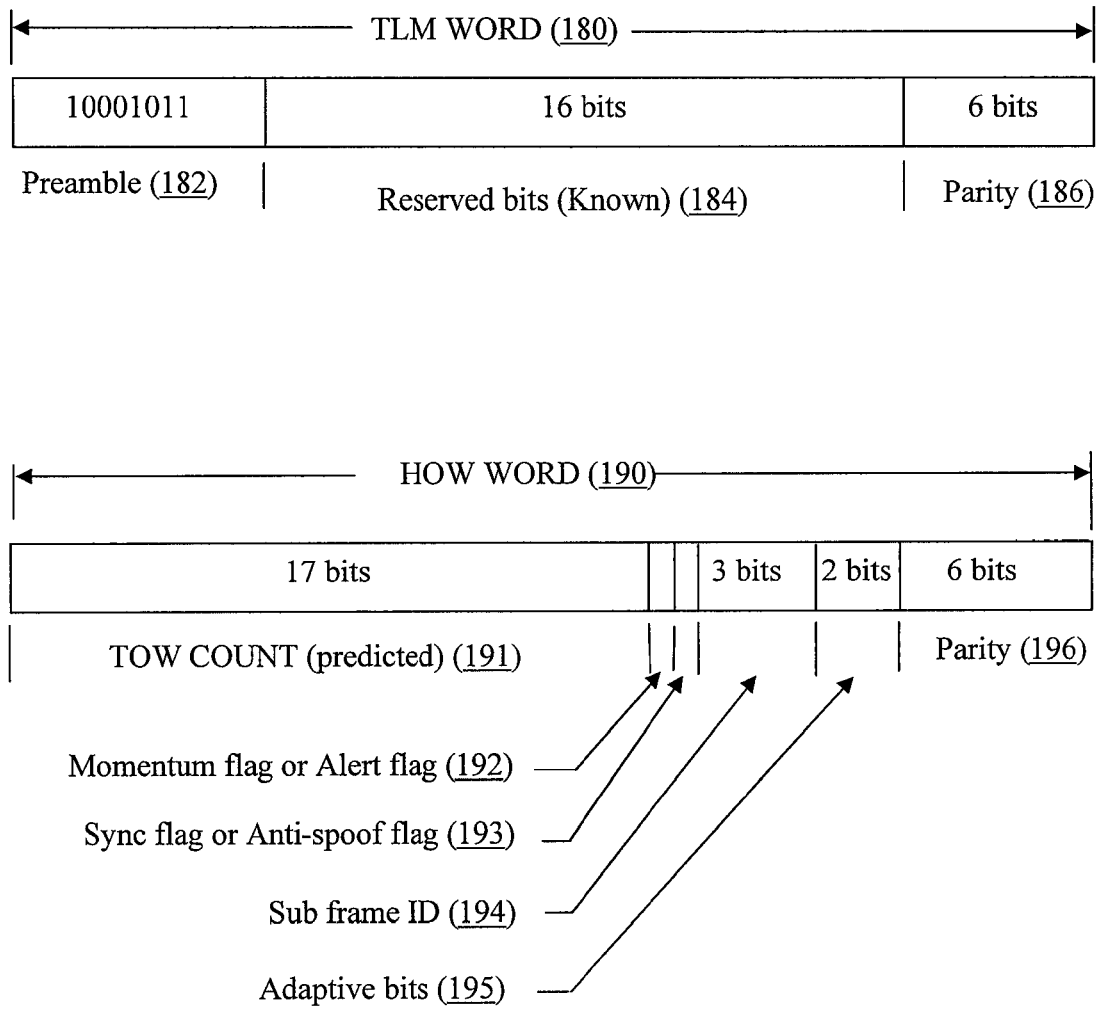
FIG. 1B   FIRST TWO WORDS OF ANY SUBFRAME

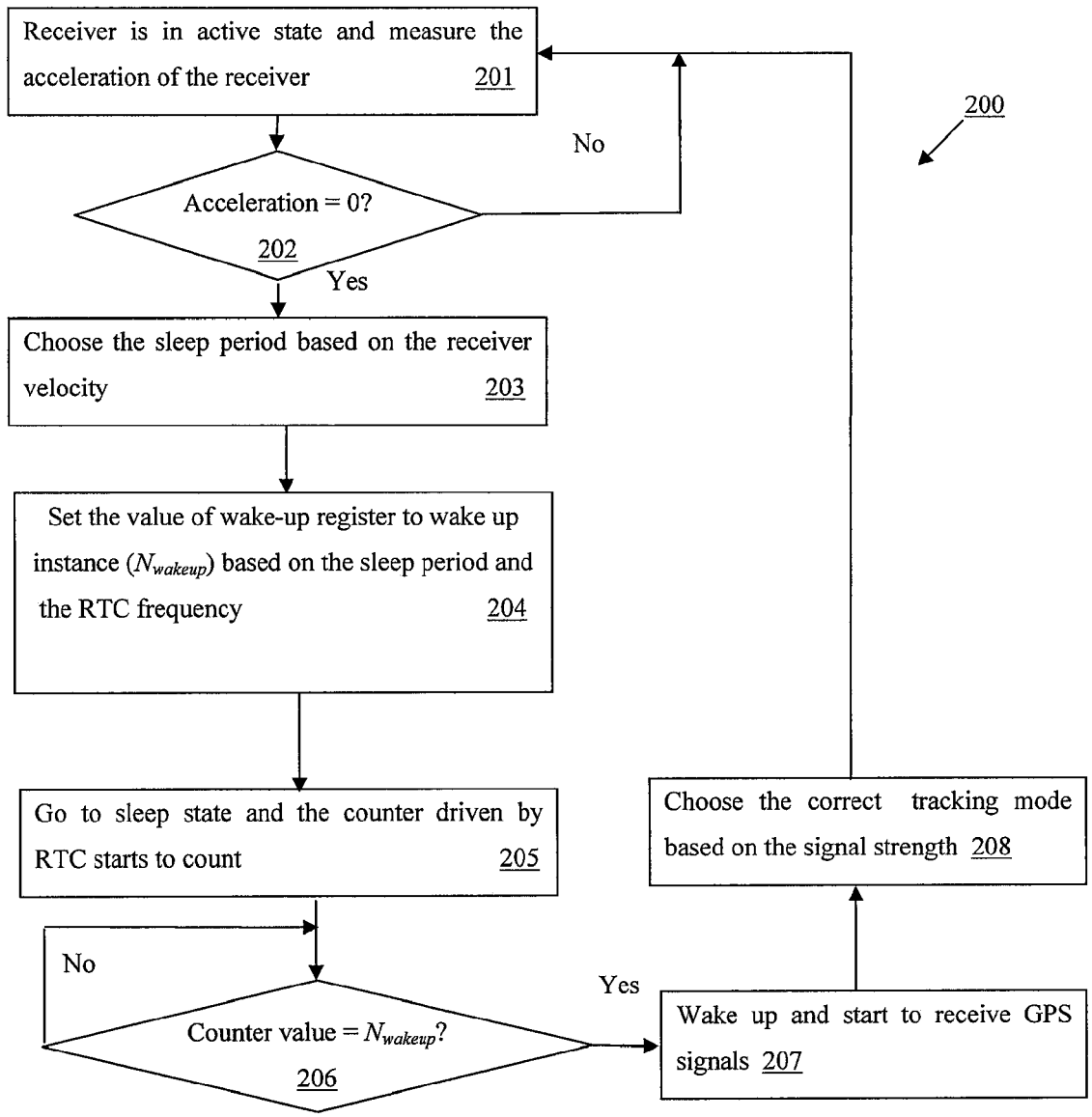
FIG. 2   Flowchart of the low power tracking process

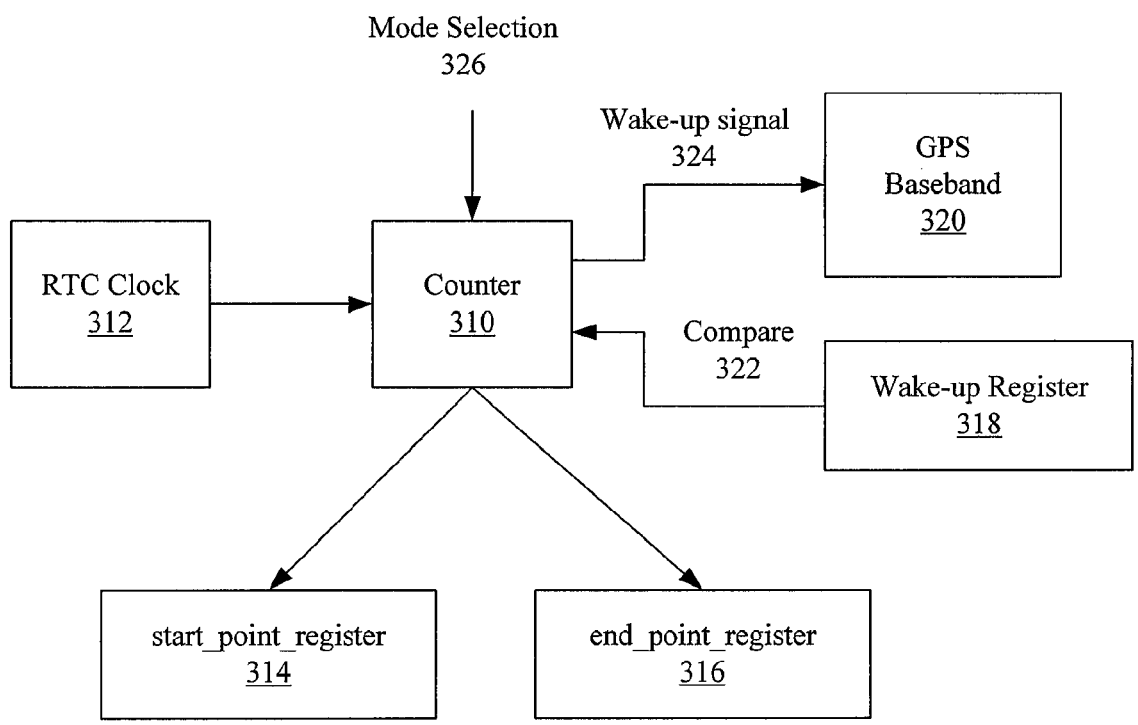
FIG. 3 An embodiment of RTC counter for wake-up control

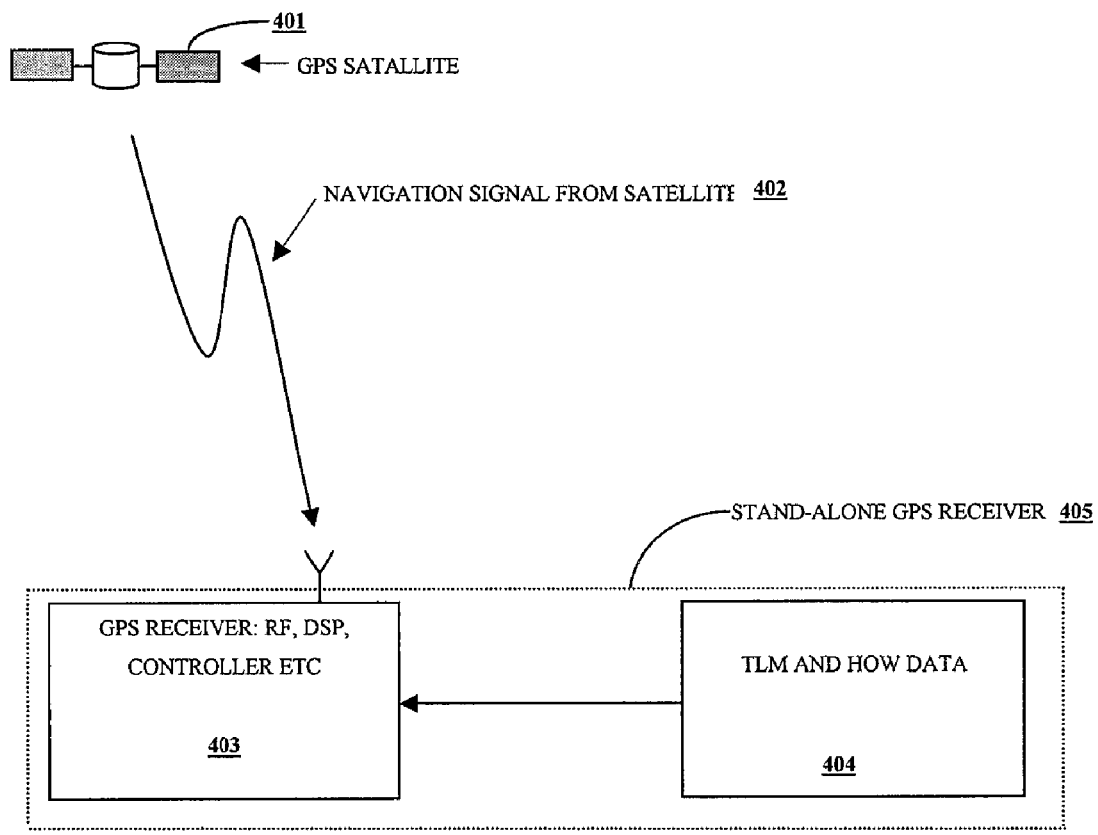
FIG 4. NAVIGATION RECEIVER SYSTEM

NAVIGATIONAL SIGNAL TRACKING IN LOW POWER MODE

FIELD OF THE INVENTION

The present invention relates generally to navigational receivers, and more particularly to systems and methods for navigational signal tracking in low power mode.

BACKGROUND OF THE INVENTION

With the development of radio and space technologies, several satellites based navigation systems have already been built and more will be in use in the near future. One example of such satellites based navigation systems is Global Positioning System (GPS), which is built and operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the pseudo-random number (PRN) code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal sequence. During the acquisition stage, the code phase search step is a half-chip for most navigational satellite signal receivers. Thus the full search range of code phase includes 2046 candidate code phases spaced by a half-chip interval. The carrier frequency search range depends upon the Doppler frequency due to relative motion between the satellite and the receiver. Additional frequency variation may result from local oscillator instability.

Coherent integration and noncoherent integration are two commonly used integration methods to acquire GPS signals. Coherent integration provides better signal gain at the cost of larger computational load, for equal integration times.

The power associated with noncoherent integration with one millisecond correlation is $$\text{Power} = \sum_{n=0}^{N-1} (I(n)^2 + Q(n)^2)$$

and the power associated with coherent integration is $$\text{Power} = \left(\sum_{n=0}^{N-1} I(n)\right)^2 + \left(\sum_{n=0}^{N-1} Q(n)\right)^2$$

where $I(n)$ and $Q(n)$ denote the in-phase and quadra-phase parts of one-millisecond correlation values from the base-band section at interval n, and N denotes the desired number of one-millisecond integration intervals.

The use of coherent integration is desired in weak signal acquisition, reacquisition and tracking. However to achieve a long coherent integration two conditions need to be met. These conditions are that the residual frequency must be very small and signal encoded data bits must be wiped off if the integration time is beyond the navigation data bit interval. Usually the residual frequency is made small by employing a large number of frequency bins. On the other hand once the integration period is more than 20 milliseconds, which is the navigation data bit duration, the modulated data need to be removed from the signal before coherent integration. A prior knowledge of the data bits is needed for this purpose and this may be based upon the structure of the navigation message. A brief explanation on the structure of the message which may help in predicting the data is given below.

The signals from the navigational satellites are modulated with navigational data at 50 bits/second. This data consists of ephemeris, almanac, time information, clock and other correction coefficients. This data stream is formatted as sub-frames, frames and super-frames. A sub-frame consists of 300 bits of data and is transmitted for 6 seconds. In this sub-frame a group of 30 bits forms a word with the last six bits being the parity check bits. As a result, a sub-frame consists of 10 words. A frame of data consists of five sub-frames transmitted over 30 seconds. A super-frame consists of 25 frames sequentially transmitted over 12.5 minutes.

The first word of a sub-frame is always the same and is known as TLM word and first eight bits of this TLM word are preamble bits used for frame synchronization. A Barker sequence is used as the preamble because of its excellent correlation properties. The other bits of this first word contain 14 telemetry bits and is not used in the position computation for civilian applications. The next two reserved bits are always '1's. The remaining 6 bits in the first word are parity check bits. The second word of any frame is the HOW (Hand Over Word) word and consists of TOW (Time Of Week), sub-frame ID, synchronization flag and parity with the last two bits of parity always being '0's. These two '0's help in identifying the correct polarity of the navigation data bits. The words 3 to 10 of the first sub-frame contains clock correction coefficients and satellite quality indicators. The 3 to 10 words of the sub-frames 2 and 3 contain ephemeris. These ephemeris are used to precisely determine the position of the GPS satellites. These ephemeris are uploaded every two hours and are valid for four hours to six hours. The 3 to 10 words of the sub-frame 4 contain ionosphere and UTC time corrections and almanac of some satellites. These almanacs are similar to the ephemeris but give a less accurate position of the satellites. The 3 to 10 words of the sub-frame 5 contain only the almanacs of different satellites in different frames.

The superframe contains twenty five frames. The contents of the sub-frame 1, 2 and 3 repeat in every frame of a super-frame except the TOW and occasional change of ephemeris every two hours. Thus the ephemeris of a particular satellite signal contains only the ephemeris of that satellite repeating in every frame. However, almanacs of different satellites are broadcast in-turn in different frames of the navigation data signal of a given satellite. Thus a total of 25 frames transmit the almanacs of all the 24 satellites in the sub-frame 5. Any additional spare satellite almanacs are included in some of the sub-frame 4.

Thus from the above, it is possible to predict some of the navigation data bits and use it to wipe off the modulated navigation data from the received signal. The data prediction can be done easily as most of the data bits remain unchanged over a length of time. The ephemeris, for example, e remains the same over time length of two hours. The almanac remains the same for several days. The synchronizing word in TLM never changes while HOW word can be easily predicted. These facts may be used to predict the data and wipe off the data from the received signal thus ensuring a long coherent integration extending over several data bits. There exists some prior art wherein the data bits are predicted to carry out a long integration. Published U.S. Patent Application 2003/0152134 predicts data under weak signal reception condition. Published U.S. Patent Application 2002/0049536 assigned to Qualcomm performs data wipe off by predicting the HOW word. This prediction is done by changing the TOW value as required and the associated parity. U.S. Pat. No. 6,611,756 assigned to Lucent similarly predicts not only the HOW but also the TLM and other data bits. U.S. Pat. No. 6,252,545 assigned to LUCENT discloses methods of long integration to acquire and track weak signals while U.S. Pat. No. 6,965,760 teaches a dynamic integration technique based on the received signal strength. All of these methods carry out integration over as much of the data bits as possible. However, it is desirable for a handheld navigation receiver to save as much power as possible while employing a long integration under weak signal conditions.

SUMMARY

Accordingly, the present invention provides systems and methods for navigational signal tracking in low power mode to conserve the power of handheld navigation receivers.

In an embodiment, the receiver cycles between sleep and wakeup states. During the sleep state, most of the components of the receiver are powered off to conserve power, and during the wakeup state, the receiver tracks navigational signals. In an embodiment, the duty cycle of the sleep/wakeup states depends on the receiver dynamic state, e.g., whether the receiver is accelerating. In another embodiment, during the wakeup state, the receiver selects a tracking mode based on the signal strength. Under weak signal conditions, a tracking mode using a long integration to track the satellite signal is disclosed. In one embodiment, a tracking mode tracks the navigation signal by performing data aided integration over a period of 1.2 seconds using known TLM and HOW data bits at the start of each navigation frame, which repeat every 6 seconds. Afterwards, to save power the receiver goes to the sleep state for the remaining period of 4.8 seconds. The tracking mode does not require prior knowledge of ephemeris or almanac. In an embodiment, a Real Time Clock (RTC) of sufficient accuracy is calibrated during the wakeup state and is used to maintain timing during the sleep state to wakeup the receiver at the appropriate time. In alternate embodiments, the clock source of the RTC comes from a highly accurate TCXO of the RF module or other external sources.

The above and other advantages of embodiments of this invention will be apparent from the following more detailed description when taken in conjunction with the accompanying drawings.

BRIEF DESCRIPTION OF THE DRAWINGS

FIG. 1A is a block diagram illustrating a GPS receiver according to an embodiment of the present invention.

FIG. 1B is an illustration of the bits in the first and second words of a sub-frame.

FIG. 2 is a flowchart of a low power tracking process according to an embodiment of the present invention.

FIG. 3 is a diagram of a Real Time Clock (RTC) counter for wake up control according to an embodiment of the present invention.

FIG. 4 is an illustration of the navigation receiver system operation according to an embodiment of the present invention.

DETAILED DESCRIPTION

FIG. 1A illustrates a receiver according to a preferred embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component 1107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

The DSP core 113 receives one millisecond integrated (correlated) I and Q values from the GPS baseband section described above. In order to acquire a GPS signal in the DSP processor, all dwells (set of carrier frequency, code offset) are searched. This is a two-dimensional search. Coherent integration and non-coherent integration are two commonly used integration methods to acquire GPS signals. Coherent integration provides better signal gain at the cost of larger computational load, for equal integration times.

Upon powering on, a navigation receiver proceeds to acquire a sufficient number of navigational satellite signals. Once the signals are acquired, the receiver continues tracking these signals. This tracking involves making corrections for the small variations in the signal frequency and the code phase. Besides this, the tracking also involves demodulating the navigation data bits embedded in the signals. During tracking, the carrier frequency and the code phase keep slowly changing because of the Doppler frequency associated with the signals from the satellite. The Doppler frequency is due to the motion of the satellite with respect the receiver. When the receiver is stationary or moving slowly, the Doppler frequency may be entirely due to the satellite motion and this can be predicted and corrected.

In the case of weak signals, a long coherent integration of the signal has to be carried out for successful tracking. For a coherent integration beyond 20 milliseconds the associated navigation data bits need to be known before hand. The first two words of any subframe in the case of GPS are the TLM and HOW words which are known or can be easily determined. The contents of theses two words are shown in FIG. 1B. The TLM word 180 contains the preamble 182 with eight bits as 10001011 which remains the same all the time. The next sixteen bits are the reserved bits 184 which are known and remain the same for long periods extending into one week and the last six bits are parity check bits 186 and can be computed based on the algorithm available in the document ICD-200 or later versions. On the other hand, the TOW COUNT value 191 in the HOW word 190 of each subsequent frame increases by one which is initialized to zero at every Saturday—Sunday midnight. The $18^{th}$ bit 192 is the momentum or alert flag depending upon the type of the satellite. The $19^{th}$ bit 193 is the synchronization flag or anti-spoof flag depending upon the type of the satellite and remains constant all the time. The next three bits 194 are the sub frame ID and its value can be determined when the subframe number is known. This can be known during the start of the tracking process and increasing it every six seconds with modulo 5. The $23^{rd}$ and $24^{th}$ bits 195 are adjustable or adaptive bits and the values are adjusted so that the $29^{th}$ and $30^{th}$ bits are '0's. The parity bits 196 are again computed as explained above. Thus all the sixty bits extending over 1.2 seconds are known and it is possible to have a 1.2 seconds long interval of data aided coherent integration at every 6 seconds, the later being the length of a subframe in GPS message structure. This integration is possible even if the ephemeris or almanac are not known a prior.

After acquisition, the receiver enters the tracking mode for the acquired satellites. Several tracking modes with different sensitivity levels are supported in the receiver. Different tracking modes can be used for different satellites depending upon the strength of satellite signals to track. An exemplary set of tracking modes is given in Table 1 with corresponding signal strengths. However, any variation of these modes may be used.

TABLE 1

| Tracking mode selection | |
|---|---|
| Signal Strength | Tracking mode |
| 35 dBHz or above | 20 ms coherent integration |
| 29~34 dBHz | 120 ms coherent integration, non-data aided |
| 23~28 dBHz | 640 ms coherent integration, non-data aided |
| 20~22 dBHz | 640 ms coherent integration, data aided |
| 15~19 dBHz | 1200 ms coherent integration, data aided |
| Below 15 dBHz | 2560 ms coherent integration, data aided |

Data aided coherent integration uses known or predicted data bits to demodulate (wipe off the data bits from) the correlated samples and coherently integrating the demodulated samples.

Although coherent integration beyond the 20 ms GPS bit period may be computed without the modulated navigation data being wiped off, the tracking sensitivity can be further improved if there are aiding data with the same length as the coherent integration. Because the first 2 words (1200 ms) of every subframe (6 seconds) are fixed or predicable, they can be used to provide data aided tracking mode during this 1200 ms (1.2 second) period for every 6 seconds under weak signal conditions.

To reduce the power consumption of a handheld GNSS receiver, the receiver will go to the sleep state as long as possible. FIG. 2 shows a flowchart 200 of the power saving process according to an embodiment of the invention. When the receiver is in the active or wakeup state, the acceleration of the receiver is monitored as shown in block 201. The acceleration can be measured by either the GNSS system itself or external low cost INS (Inertial Navigation System) components, e.g., an accelerometer. If any non-zero acceleration is detected, the receiver is not allowed to enter the sleep state. If acceleration is zero as in the 'yes' branch of logic block 202, the receiver is either static or moving with constant velocity. Under this condition, the receiver can prepare to go to sleep mode. Otherwise, the receiver stays in the active state. As shown in block 203, the time duration of the sleep state is determined by the receiver velocity. In static condition, the sleep period can be set to longest period while the sleep period gets shorter with increasing velocity because the position information based on extrapolation will not be accurate under high velocity conditions. Before going to sleep, the wake-up register, which controls the receiver wake up time, must be set to some appropriate value $N_{wakeup}$ as in block 204. This value is based on the duration of the sleep state and the RTC frequency, which drives the counter during sleep state. Afterwards as shown in block 205, the receiver goes into the sleep state and power is switched off to many of the components of the receiver, shown in FIG. 1, which may include the GPS baseband, Radio Frequency (RF) module, Digital Signal Processor (DSP) etc. There are various possible sleep states with different components being powered off. In all sleep states the power consumed is much less than that of the wakeup state. In one embodiment, the GPS RF module, GPS baseband and DSP core are all switched off as well as the external SDRAM while the RISC processor, e.g., ARM processor, is still powered on but running at a very low frequency to continue to output position information based on the extrapolation results without any performance degradation. As soon as the receiver enters the sleep state, the counter driven by RTC starts to count clock pulses, which controls the time duration of sleep. When the value of the counter reaches the preset value of $N_{wakeup}$ in the wake-up register as shown in the logical block 206, the receiver wakes up and starts to receive GPS signal as shown by the block 207. In the next block 208, a correct tracking mode is chosen based on the signal strength according to Table 1 given earlier.

When the acceleration is zero in block 202, the receiver can measure the velocity, e.g., using a speedometer and e-compass, and use this velocity to extrapolate the receiver position during the sleep state. For example, the extrapolated position may be equal to $\vec{p}_{last} + \vec{v}t$, where $\vec{p}_{last}$ is the last position when GPS is in active mode, $\vec{v}$ is the velocity of the receiver, and t is the time of travel with velocity $\vec{v}$. Because there is no acceleration, the velocity should be kept unchanged during sleep time. The time t may be obtained from the RTC.

In order to keep tracking the signal after wake up, the time of wake up must be very accurate to the order of several microseconds. Otherwise, the code delay will be incorrect and reacquisition of the signal is inevitable. During the sleep state, a very low frequency real time clock (RTC) counts the time. In most of the cases, the RTC frequency is 32.768 KHz, although other frequencies may be used as well. A counter counts the RTC clock pulses starting exactly when the receiver goes to sleep until it reaches a preset value in the wake-up register, at which time the receiver wakes up to restart tracking GPS signals. In this way, the sleep period can be controlled accurately. In one embodiment, a low cost RTC clock is used in the handheld device. However, such a low cost RTC usually has an accuracy of several tens of ppm (parts per million), which is not accurate enough to maintain the tracking. To overcome this, the RTC is calibrated when the receiver is in the active mode. As shown in FIG. 3, when the mode selection 326 is set to '0', the counter is used to calibrate the RTC and it is used for wake up control when the mode is '1'. During calibration stage, the start_point_register 314 and end_point_register 316 are used to record the values from the counter 310 at the start and end time of calibration. The corresponding start and end time point of calibration, denoted as $T_s$ and $T_e$, respectively, can be accurately obtained by GNSS system when the receiver is in the active state. The actual frequency of the RTC 312 can be obtained by:

$$f_{RTC} = \frac{N_{end\_ponit\_register} - N_{start\_ponit\_register}}{T_e - T_s} \quad (1)$$

where $f_{RTC}$ is the clock frequency. Before sleep, the wake-up register 318 can be set to $N_{wakeup}$, whose value can be determined by:

$$N_{wakeup} = T_{sleep} \times f_{RTC} \quad (2)$$

where $T_{sleep}$ is the desired sleep period, which may be determined by the receiver dynamics.

During sleep period as soon as the value of the counter is equal to that of the wake-up register 318, a wake up signal 324 is generated and the GPS baseband section 320 is powered on by the wake up signal 324. In another embodiment, if the oscillator used in the RF module is of very high accuracy, such as one with an accuracy of 2 ppm or better TCXO (Temperature Compensated Crystal Oscillator), then the RF module is not completely shut down. Instead the RF module will be in a low power state, in which only the crystal oscillator is on and the clock signal is output while the rest of the components are powered off. This high frequency clock is decimated to produce a low frequency RTC clock. Because this clock is usually from a high precise TCXO, a high accuracy can be guaranteed in the RTC and so no additional calibration is needed. In another embodiment, the required clock may be from an external source such as cellular base station or DTV or any broadcast signal with stable frequency. The clock may also be from the handheld device clock where the handheld device contains a communication device such as cellular telephone.

The FIG. 4 shows a typical stand-alone GPS receiver 405 in which the data memory 404, which stores the TLM and HOW data, is shown separately for illustration purpose. The GPS signal 402 is modulated with navigation data transmitted from a typical GPS satellite 401. The receiver 403 correlates the received signal using the predicted or stored data bits. Under weak signal environment, data aided long coherent integration is used in the tracking mode. The navigation data is usually stored in the data memory of the receiver. Although not all the navigation data are known, the TLM and HOW words of every subframe are known or predictable even if the ephemeris and almanac are being updated. The wake up time can be controlled to a time to coincide with the starting point of the available navigation data so that the high sensitivity data aided tracking mode can be initiated. For example, under static indoor environment, the receiver wakes up to track the navigation signal with a data aided integration over 1.2 seconds using the known TLM and HOW data bits at the start of each navigation frame, which repeats every 6 seconds. Afterwards, to save power the receiver goes to the sleep state for the remaining period of 4.8 seconds.

During the tracking process, it is necessary to download the ephemeris, clock correction data whenever new versions are uploaded to the satellite. The Issue Of Data Ephemeris (IODE) and Issue of Data Clock (IODC) change with the new data set and so may be used to identify any upload. The IODE is given by 61 to $68^{th}$ bits of the subframe 2 and can easily be determined by using the data aided integration beyond the known 60 bits of the first two words. A Viterbi or similar algorithm may be used to determine the IODE data bits. Details on data aided acquisition and tracking can be found in patent application Ser. No. 11/548,204 titled "A Method of Mixed Data Assisted and Non Data Assisted Navigation Signal Acquisition, Tracking and Reacquisition," filed on Oct. 10, 2006, the specification of which is incorporated in its entirety by reference. The IODC may also be similarly determined. The IODE and IODC are tested when needed or during a fixed time interval, e.g., 2 hours after the previous download. The downloading of ephemeris may also subject to availability of resources such as battery power. Under weak signal conditions, the ephemeris can be downloaded by downloading several 30 second frames and overlaying the same.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Accordingly, it is intended that the appended claims be interpreted as covering all alterations and modifications as fall within the spirit and scope of the invention.

What is claimed is:

1. A method of tracking navigational signals at a receiver, comprising:
   cycling between sleep and wakeup states;
   monitoring a dynamic state of the receiver, including measuring an acceleration of the receiver during the wakeup state;
   determining a duty cycle of the sleep and wakeup states based on the dynamic state of the receiver;
   selecting a tracking mode from a plurality of tracking modes based on received signal strength during the wakeup state, wherein each tracking mode of the plurality of tracking modes respectively corresponds to a different signal power level; and tracking a navigation signal by performing data aided long integration of the signal during the wakeup state, wherein tracking the navigation signal in certain of the selected tracking modes includes demodulating navigation data bits included in the navigation signal and coherently integrating samples of the signal using the demodulated navigation data bits.

2. The method of claim 1, wherein the data aided long integration is performed using known data bits of TLM and HOW words.

3. The method of claim 1, wherein the data aided long integration is performed over part of the total length of TLM and HOW words.

4. The method of claim 1, further comprising maintaining a sleep duration using a counter driven by a real time clock (RTC) in the receiver.

5. The method of claim 1, further comprising waking up the receiver at a time coinciding with the start of TLM and HOW words in a signal.

6. The method of claim 1, further comprising extrapolating a position of the receiver during the sleep state.

7. The method of claim 1, wherein a radio frequency (RF) module and baseband section of the receiver, including a digital signal processor (DSP) processor, are powered off during sleep state.

8. The method of claim 4, wherein the RTC is driven by a highly accurate clock in a radio frequency section of the receiver.

9. The method of claim 4, wherein the RTC is calibrated by external timing or synchronization signal.

10. The method of claim 4, wherein the RTC is a standalone time keeping device.

11. The method of claim 4, wherein the RTC clock is calibrated during the wakeup state.

12. The method of claim 11, wherein the RTC is calibrated based on Global Positioning System (GPS) time during the wakeup state.

13. The method of claim 4, wherein a single counter is used for calibration of RTC frequency and control of receiver wake up time.

14. The method of claim 1, further comprising downloading the current navigation data from the satellites when a battery power level and a signal strength level are at a predetermined level, and absence of current navigation data.

15. The method of claim 14, further comprising decoding IODE (Issue Of Data Ephemeris) and IODC (Issue of Data Clock) data bits at fixed time intervals for change of associated data.

16. The method of claim 15, further comprising using a data bit prediction technique to determine the IODE and IODC bits.

17. A navigational receiver, comprising:
a radio frequency (RF) module for receiving a signal from a navigation satellite;
a baseband section coupled to the RF module for correlating the received signal with a locally generated replica; and
a processor, wherein the processor is configured to cycle the receiver between sleep and wakeup states, monitor a dynamic state of the receiver, including monitoring an acceleration of the receiver during the wakeup state, determine duty cycle of the sleep and wakeup state based on the dynamic state of the receiver, select a tracking mode from among a plurality of tracking modes based on the strength of the received signal during the wakeup state, wherein each tracking mode of the plurality of tracking modes respectively corresponds to a different signal power level, and track the received signal by performing data aided long integration on the correlated received signal during the wakeup state, wherein performing data aided long integration in certain of the selected tracking modes includes demodulating the correlated received signal and coherently integrating samples of the signal using the demodulated correlated received signal.

18. The receiver of claim 17, wherein the processor performs the data aided long integration using known data bits of TLM and HOW words.

19. The receiver of claim 17, wherein the processor performs the data aided long integration over part of the total length of TLM and HOW words.

20. The receiver of claim 17, further comprising:
a real time clock (RTC); and
a counter, wherein the counter is driven by the RTC to maintain a sleep duration for the sleep state.

21. The receiver of claim 17, wherein the receiver wakes up at a time coinciding with the start of TLM and HOW words in a signal.

22. The receiver of claim 17, wherein the processor extrapolates a position of the receiver during the sleep state.

23. The receiver of claim 17, wherein the RF module and the baseband section of the receiver, including a digital signal processor (DSP) processor, are powered off during sleep state.

24. The receiver of claim 20, wherein the RTC is driven by a highly accurate clock in a radio frequency section of the receiver.

25. The receiver of claim 20, wherein the RTC is calibrated by external timing or synchronization signal.

26. The receiver of claim 20, wherein the RTC is a standalone time keeping device.

27. The receiver of claim 20, wherein the RTC clock is calibrated during the wakeup state.

28. The receiver of claim 27, wherein the RTC is calibrated based on Global Positioning System (GPS) time during the wakeup state.

29. The receiver of claim 20, wherein a single counter is used for calibration of RTC frequency and control of receiver wake up time.

30. The receiver of claim 17, wherein the processor downloads the current navigation data from the satellites when a battery power level and a signal strength level are at a predetermined level, and absence of current navigation data.

31. The receiver of claim 30, wherein the processor decodes IODE (Issue Of Data Ephemeris) and IODC (Issue of Data Clock) data bits at fixed time intervals for change of associated data.

32. The receiver of claim 31, wherein the processor uses a data bit prediction technique to determine the IODE and IODC bits.

33. The receiver of claim 17, wherein the processor comprises a digital signal processor (DSP) processor and a RISC processor.

34. The receiver of claim 17, further comprising an accelerometer, wherein the processor uses the accelerometer to monitor the dynamic state of the receiver.

35. The method of claim 16, wherein the data bit prediction technique used to determine the IODE and IODC bits is a Viterbi technique.

36. The receiver of claim 32, wherein the data bit prediction technique used to determine the IODE and IODC bits is a Viterbi technique.

* * * * *

UNITED STATES PATENT AND TRADEMARK OFFICE
CERTIFICATE OF CORRECTION

PATENT NO. : 7,847,726 B2
APPLICATION NO. : 11/615431
DATED : December 7, 2010
INVENTOR(S) : Jia et al.

Page 1 of 1

It is certified that error appears in the above-identified patent and that said Letters Patent is hereby corrected as shown below:

On the Title Page, in Item (75), under "Inventors", in Column 1, Line 2, delete "Kurethaya," and insert -- Kudrethaya, --, therefor.

In Column 5, Line 21, delete "theses" and insert -- these --, therefor.

Signed and Sealed this
First Day of January, 2013

David J. Kappos
*Director of the United States Patent and Trademark Office*